US 8,505,187 B2

(12) United States Patent
Vieth (10) Patent No.: US 8,505,187 B2
(45) Date of Patent: Aug. 13, 2013

(54) GUIDE AND SETTING DEVICE FOR FASTENER ELEMENTS

(75) Inventor: Michael Vieth, Bad Vibel (DE)

(73) Assignee: PROFIL Verbindungdtechnik GmbH & Co. KG, Friedrichsdorf (DE)

( * ) Notice: Subject to any disclaimer, the term of this patent is extended or adjusted under 35 U.S.C. 154(b) by 417 days.

(21) Appl. No.: 13/009,585

(22) Filed: Jan. 19, 2011

(65) Prior Publication Data

US 2012/0102718 A1    May 3, 2012

(30) Foreign Application Priority Data

Jan. 22, 2010 (DE) .................... 10 2010 005 404

(51) Int. Cl.
*B21J 15/02* (2006.01)
*B21J 15/10* (2006.01)

(52) U.S. Cl.
USPC ........... 29/524.1; 29/525.06; 29/709; 29/715; 29/716; 29/798; 29/243.53

(58) Field of Classification Search
USPC ............. 29/432.1, 432.2, 524.1, 525.06, 709, 29/714, 715, 716, 798, 243.53; 227/139
See application file for complete search history.

(56) References Cited

U.S. PATENT DOCUMENTS

| | | | |
|---|---|---|---|
| 3,967,664 A | | 7/1976 | Lesner et al. |
| 5,974,660 A | * | 11/1999 | Muller ............................ 29/823 |
| 6,925,698 B2 | * | 8/2005 | Goodsmith et al. ......... 29/432.1 |
| 6,957,483 B2 | * | 10/2005 | Woods ............................ 29/798 |
| 7,331,098 B2 | * | 2/2008 | Matthews et al. ............ 29/524.1 |
| 2003/0164381 A1 | | 9/2003 | Goodsmith et al. |

FOREIGN PATENT DOCUMENTS

| | | |
|---|---|---|
| DE | 3 937 903 A1 | 5/1991 |
| DE | 39 37 903 | 5/1991 |
| DE | 102 58 928 | 10/1996 |
| DE | 195 12 198 | 7/2004 |
| DE | 10 2006 062 073 | 7/2007 |
| DE | 10 2006 016 255 | 10/2007 |
| EP | 0 755 749 | 1/1997 |

(Continued)

OTHER PUBLICATIONS

European Search Report in corresponding European Patent Application No. 11 000 200.3-1262 dated Apr. 5, 2011.

(Continued)

*Primary Examiner* — Jermie Cozart
(74) *Attorney, Agent, or Firm* — Hershkovitz & Associates, PLLC; Abraham Hershkovitz (57) ABSTRACT

A guide and setting device for elements, in particular fastener elements comprising a hollow guide piece, a plunger axially displaceably arranged within the guide piece and holding members which are displaceably guided perpendicular to the plunger and biased in the direction towards the longitudinal axis of the plunger and/or of the guide piece. In a retracted loading position of the plunger one element can be inserted between the holding members and the free end of the plunger. The holding members can be opened as a result of the axial advanced movement of the plunger and the respective element moved in the axial direction past the holding members. Further holding members following the first named holding members are provided which hold the element during a setting stroke. Furthermore, latching elements are provided which prevent opening of the further holding members during the setting stroke but after the completion of the setting stroke allow the opening of the further holding members to release the element. A method is also claimed.

17 Claims, 7 Drawing Sheets

(56) References Cited

FOREIGN PATENT DOCUMENTS

| | | |
|---|---|---|
| EP | 0 755 749 A1 | 1/1997 |
| EP | 0 864 396 | 9/1998 |
| EP | 0 922 538 A2 | 6/1999 |
| EP | 1 382 418 A1 | 1/2004 |
| EP | 1 430 229 | 6/2004 |
| EP | 0 864 396 | 6/2005 |
| EP | 1 430 229 | 11/2005 |
| EP | 0 755 749 B2 | 7/2006 |

OTHER PUBLICATIONS

English language translation of European Search Report in corresponding European Patent Application No. 11 000 200.3-1262 dated Apr. 5, 2011.

Translation of German Search Report dated Jun. 5, 2012 in corresponding German Patent Application No. 10 2010 005 404.6.

* cited by examiner

GUIDE AND SETTING DEVICE FOR FASTENER ELEMENTS

CROSS-REFERENCE TO RELATED APPLICATIONS

This application claims priority of German Patent Application No. 10 2010 005 404.6, filed Jan. 22, 2010, the disclosure of which is expressly incorporated by reference herein in its entirety.

FIELD OF THE INVENTION

The present invention relates to a guide and setting device for elements, in particular fastener elements comprising a hollow guide piece, a plunger axially displaceably arranged within the guide piece and holding members which are displaceably guided perpendicular to the plunger and biased in a direction towards the longitudinal axis of the plunger and/or of the guide piece wherein, in the retracted loading position of the plunger, one element can be inserted between the holding members and the free end of the plunger, and also to a method for the operation of a guide and setting device.

BACKGROUND OF THE INVENTION

A guide and setting device of this kind is known from EP 0 755 749 B4. It is successfully used for relatively flat circular rivet elements, in particular those with a rounded shape and has the particular advantage that the elements are cleanly guided up to the attachment to a sheet metal part. A guide and setting device of the known kind is however not absolutely suited for the guidance and the setting of elongate elements, in particular not for elements which each have a head part of larger transverse dimension and a shaft part of smaller transverse dimension and preferably also a rivet section which forms a shoulder with the shaft part, the shoulder forming a sheet metal contact surface.

The object of the present invention is to further develop a guide and setting device of the initially named kind so that it can reliably guide and set elongate elements having a head part of larger transverse dimension and a shaft part of smaller transverse dimension and preferably also a rivet section which forms a shoulder with the shaft part, with the shoulder forming a sheet metal contact surface, with the apparatus being capable of being manufactured at favorable cost and operating automatically and reliably over longer periods of time with high numbers of parts of the corresponding elements.

SUMMARY OF THE INVENTION

In order to satisfy this object an apparatus of the initially named kind is provided which is characterized in that the holding members can be opened as a result of the axial advance movement of the plunger and the respective element moved in the axial direction past the holding members, in that further holding members following the first named holding members are provided which hold the element during a setting stroke and in that latching elements are provided which prevent opening of the further holding members during the setting stroke but, after the completion of the setting stroke, allow the opening of the further holding members to release the element.

A guide and setting device of this kind can be constructed very compactly because the first and the second holding members can be arranged in space saving manner directly beneath one another and can also be made relatively flat. Furthermore, and particularly important, is that the further holding members which are non-displaceably arranged in the correct position in the latched state by means of the latching elements hold the respective element so that this is not only held in the correct position but rather also cleanly guided and held so that it is tilt-free. This is important when positioning the shaft part or the rivet section in a prepared hole or when piercing a component, which is fundamentally possible when using the guide and setting device, i.e. this can also be used as a piercing head.

The guide and setting device is preferably so designed that the first holding members have a shape at their confronting end faces which has, following one another in the direction of the longitudinal axis, at least one first section which receives at least one region of the head part adjacent the shaft part and tapers to a second section which is matched to the transverse dimension of the shaft part, with the inclined surfaces of the first section being designed in order to bring about the opening of the first holding members by the head part under the action of the plunger.

In contrast to the known arrangement in accordance with EP 0 755 749 B4 the holding members are opened by the pressure of the head part of the element instead of by the end face of the plunger, which would however also be possible in accordance with the invention. Furthermore, the elements are introduced falling through the guide passage, or by means of a blast of compressed air or otherwise, axially between the already closed first holding members instead of being inserted from the side between the holding members, which would however also be conceivable but which increases the constructional height of the device depending on the length of the shaft part. Since the shaft part of the element can be inserted between the further holding members before the head part of the element leaves the first holding members a clean guidance of the element is always ensured, with the further holding members, which were hitherto initially opened as a result of a bias away from the longitudinal axis of the plunger, being pushed inwardly and latched, on or shortly before the transfer by the latching elements which are preferably moved synchronously with the plunger.

The further holding members preferably have a shape at their end faces confronting one another which have, following one another in the direction of the longitudinal axis at least one first section which receives at least a region of the head part adjacent to the shaft part, a second section which tapers from the first section to the transverse dimension of the shaft part with inclined surfaces of the first section being designed to enable the opening of the further holding members by the head part on or after the refraction of the latching elements and hereby release the respective element and a third section which acts on the shaft part in order to hold the element free from tilting during the setting process, optionally in cooperation with the first section.

This shaping not only ensures the accurate positioning and tilt-free holding of the element during the setting but rather enables, following the removal of the latching or blocking elements, for example during the initial movement during the opening of the press in which the guide and setting device is installed, the head part of the element to open the further holding members after the completed setting process and during the subsequent opening of the press and to hereby release the element. This takes place such that the element cannot be torn out of the component or sheet metal part to which it is now fastened. For this purpose the component or sheet metal part must be held by other means, for example by a spring-loaded hold-down member which biases the component of the sheet metal part away from the guide and setting device, or holds the component or the sheet metal part or the rivet section of the element (if such a rivet section is present).

The first named holding members, which are preferably formed by two oppositely disposed holding members, are preferably biased towards one another by means of springs. In the same sense the further holding members, which are also preferably formed by two oppositely disposed holding members, are biased away from one another by means of springs.

This represents a particularly simple, compact and cost-favorable solution although the use of a different number of first holding members and/or further holding members, for example in each case three or four holding members would also be conceivable.

The guide and setting device preferably comprises an attachment part which is designed for the attachment to a tool or a press and also a hollow guide piece which is movably attached to the attachment part via guides carried by the attachment part which are biased away from it and movable in the direction towards it; with the plunger also being attached to the attachment part.

A design of this kind harmonizes well with the operation of a press in which the guide and setting devices is used, in particular with its closing and opening strokes and moreover operates very reliably.

In this connection the plunger is preferably attached to the attachment part for a limited movement in the direction of the longitudinal axis relative to the attachment part, with the amplitude of a movement of the guide piece which is provided relative to the attachment part being larger than the restricted movement of the plunger relative to the attachment part which is provided and a device is provided in order to determine whether the plunger is located in a forwardly biased position or in an urged back position.

This arrangement which is particularly simple to realize by a displaceable attachment of the plunger to the attachment part makes a reliable check possible as to whether, during a so-called control stroke of the guide and setting device, an element is present between the first holding members. Should this not be the case, then the further operation of the press can be timely interrupted by the absence of a corresponding signal. For example a determination is made by means of a proximity sensor or by means of an end switch or micro switch or another initiator, whether the amplitude of the intended restricted movement of the plunger relative to the attachment part is achieved.

A guide and setting device is particularly preferred in which the guides are secured to respective pistons which slide in respective cylinders of the attachment part and in which the pistons or the cylinder spaces can be acted on by fluid pressure at the side remote from the hollow guide piece in order to bias the hollow guide piece away from the attachment part.

Furthermore it is favorable when the pistons or the cylinder spaces can be acted on by a control pressure at the side adjacent to the hollow guide piece. The control pressure can for example be utilized for the above-mentioned control stroke. Through the short term application of the control pressure the guide piece can be moved in the direction towards the attachment part against any pressure that is present in the chambers at the sides of the pistons remote from the guide piece during each working cycle after the introduction of a new element, so that the plunger contacts the element and triggers the corresponding signal of the proximity sensor. Should an element not be present in the first holding fingers then the expected signal does not occur and the further operation of the press is prevented. It would also be conceivable to use the closing of the press for this function instead of a control pressure since the guide piece is also moved towards the attachment part during the closing of the press and moves the plunger relative to the sensor provided an element is present.

The latching elements are preferably formed by sliders which, on movement of the guide piece towards the attachment part—which is brought about by the closing of the press, are moved synchronously to the movement of the plunger behind the further holding members and move these towards one another against the spring bias and latches them. During the opening of the press the latching elements are then retracted out of the vicinity of the further holding members in order to prevent the latched holding members damaging the element or the component or the sheet metal part, whereby the further holding members can then be moved apart from one another, on the one hand as a result of the spring bias and on the other hand by the movement of the head part along their ramp surfaces.

A guide and setting device is preferred in which the sliders extend parallel to the longitudinal axis and are attached to the attachment part. At their ends respectively confronting the further holding members, the sliders preferably have a respective ramp which cooperates with corresponding ramp surfaces of the further holding members in order to move these towards one another and to bring them into engagement with the respective element. This represents a particularly ingenious design which operates very reliably.

The sliders preferably have a respective support surface at their sides facing the named ramps which, in the latched position, contact a fixed surface of the hollow guide piece. In this way, the elongate sliders are so supported that they are not exposed to any pronounced bending moments, whereby they can be made narrow and compact.

The method in accordance with the invention for the attachment of an element to a sheet metal part by means of a guide and setting device has the following features:

a) the elements, which each have a head part with a larger transverse dimension and a shaft part with a smaller transverse dimension, in particular fastener elements, are introduced singly into a hollow guide piece and are received by first holding members biased towards one another in the region of the head part with their shaft part to the fore, b) the elements are subsequently moved through the holding members by a plunger axially displaceably arranged within the guide piece during an opening movement of the first holding members perpendicular to the longitudinal axis of the plunger which is brought about hereby, c) the respective element is then received in a mount formed by further holding members which hold the element during the setting stroke, d) latching elements are used in order to prevent opening of the further holding members during the setting stroke, e) after the completion of the setting process the latching elements are released in order to permit the opening of the further holding members for the release of the element.

This method ensures that the respective element is always guided in problem-free manner and is held against undesired tilting prior to the completion of the setting stroke, i.e. for example prior to the riveting of the element to a sheet metal part or other attachment of the element, whereby a tilting or a faulty positioning cannot occur. Furthermore, the method ensures that the guide and setting device can be reliably released from the element at the end of the setting stroke.

The plunger is, as mentioned above, preferably restrictedly movable arranged relative to a fixed part of the guide and setting device, whereby the method includes the further step of checking the presence of an element and indeed in such a way that it is determined whether, on the approach of the plunger to the element held by the first holding fingers, the contact of the plunger with the element leads to a restricted deviation movement of the plunger relative to the fixed part which is detected.

In this way faulty processes can be prevented if for some reason no element is present.

Finally, it is particularly favorable when the guide and setting device is attached to a tool of a press and if the listed steps a) to e) are carried out or brought about by the closing and subsequent opening of the press.

BRIEF DESCRIPTION OF THE FIGURES

The invention will subsequently be explained in more detail with reference to embodiments and the accompanying drawings in which are shown.

DETAILED DESCRIPTION OF THE INVENTION

Reference is first made to FIG. 1A to 1D. There an example is shown for a functional element, here in the form of a rivet element 1, which can be inserted into a sheet metal part by means of the guide and setting device in accordance with the invention. The shown element 1 has a head part 2 of larger transverse dimension and a shaft part 3 of smaller transverse dimension and also a rivet section 5 forming a shoulder 4 with the shaft part 3, the shoulder 4 forming a sheet metal contact surface 6.

A plurality of elongate ribs 7 providing security against rotation are provided at the rivet section 5 which extend over substantially the entire length of the cylindrical part of the rivet section, and also noses 8 providing security against rotation which are formed in the region of the sheet metal contact surface 4. The free end face of the rivet section 5 has a rounded outer surface 9 and a conical inner cutting surface 11 as well as a hollow cylindrical passage 13 which can best be seen from FIG. 1B.

Possibilities for providing security against rotation such as the elongate ribs 7 and the noses or noses 8 are described and claimed in the German patent application 10 2006 062 073.9.

Figure 1A:
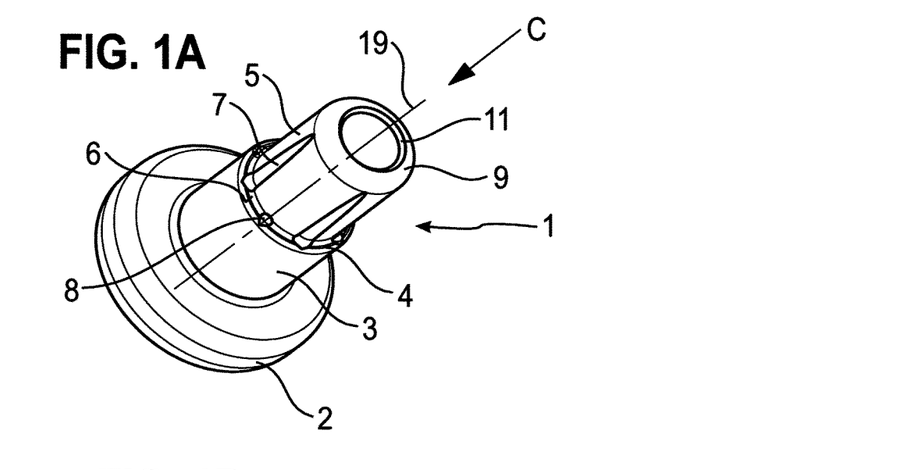
FIG. 1A a perspective representation of a possible design of an element which can be guided and set by means of the guide and setting device in accordance with the invention, FIG. 1B a side view of the element in accordance with FIG. 1A as shown partly in section, FIG. 1C an end view of the element of FIG. 1A seen in the arrow direction C, FIG. 1D a representation of the element in accordance with FIG. 1A after the attachment of the sheet metal part, FIG. 2 a sectional drawing of a guide and setting device in accordance with the invention seen in a longitudinal section shortly before the introduction of an element into the mount formed by the two first holding members, FIG. 3 a sectional drawing corresponding to FIG. 2 but directly after the introduction of an element into the mount formed by the two first holding members, FIG. 4 a sectional drawing in a sectional plane through the longitudinal axis of FIG. 2 or FIG. 3 perpendicular to the plane of the drawing of FIG. 2 or FIG. 3 but after the insertion of the rivet section of element into a sheet metal part, i.e. at the end of the setting stroke, FIG. 5 a sectional drawing corresponding to FIG. 4 but after the opening of the press and the movement apart of the guide piece and of the attachment part of the guide and setting device in accordance with the invention, FIG. 6 a perspective representation of one of the first holding members and FIG. 7 a perspective illustration of one of the further holding members.
Figure 1B:
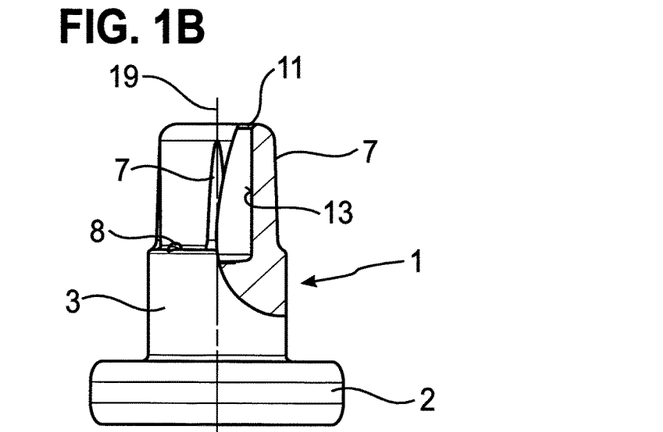
Figure 1C:
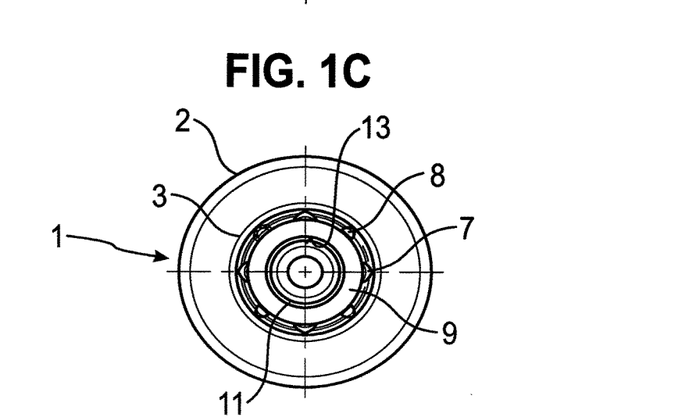
Figure 1D:
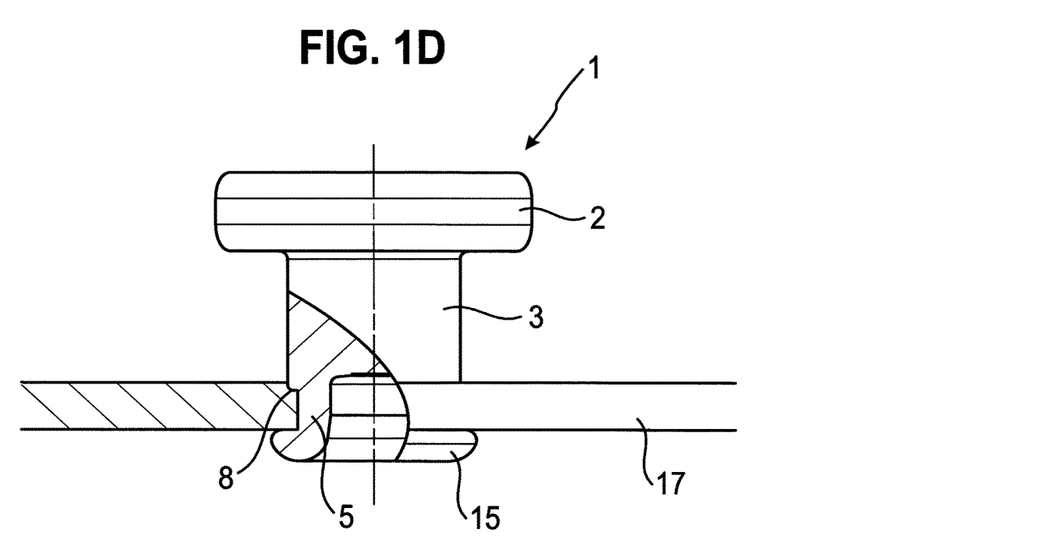

The design of the free end face of the element with the rounded surface 9 and the conical cutting surface 11 signifies that the element shown can also be designed in self-piercing manner, i.e. is able, on attachment to the sheet metal part 17, to pierce a piercing slug out of the sheet metal part in collaboration with a corresponding die button, whereby the rivet section is subsequently formed into a rivet bead 15 which is evident from FIG. 1D. The element can, however, also be inserted into a pre-pierced sheet metal part, as shown in FIG. 1D, i.e. it is not essential to use the self-piercing embodiment. The most favorable form for the free end face of the rivet section can be seen from the European patent 1 430 229.

At this point it should be brought out that the form of the element that is shown should in no way be understood restrictively. Normally, the head part 2 should have a transverse dimension which is larger than a transverse dimension of the shaft part 3. As a consequence, the head part 2 could for example have a rectangular shape which projects at two opposed sides beyond the shaft part 3. Other shapes of the head part are also entirely possible, such as for example a polygonal or a wave-shaped outer outline. It is only important that the head part is larger in one transverse direction than a transverse dimension of the shaft part 3. The shaft part 3 which is also made in round cylindrical shape can also have another shape, for example an oval or polygonal shape. Furthermore, the presence of a rivet section is in no way essential. For example the shaft part 3 could be conceived for insertion into a circuit board so that it only has to be inserted into a corresponding hole in the circuit board, with the shaft part subsequently being soldered to the circuit board or welded by means of ultrasound.

The described features 7, 8 providing security against rotation are also in no way essential, in particular not when the element does not have the function of transferring torques.

Although the element 1 is shown as a bolt element it could also be realized as a hollow element such as a nut element. In this case the cylindrical passage 13 would for example extend over the full length of the element and could also be provided in part (or also in full) with a thread.

Reference will now be made to the further FIGS. 2 to 7.

Figure 2:
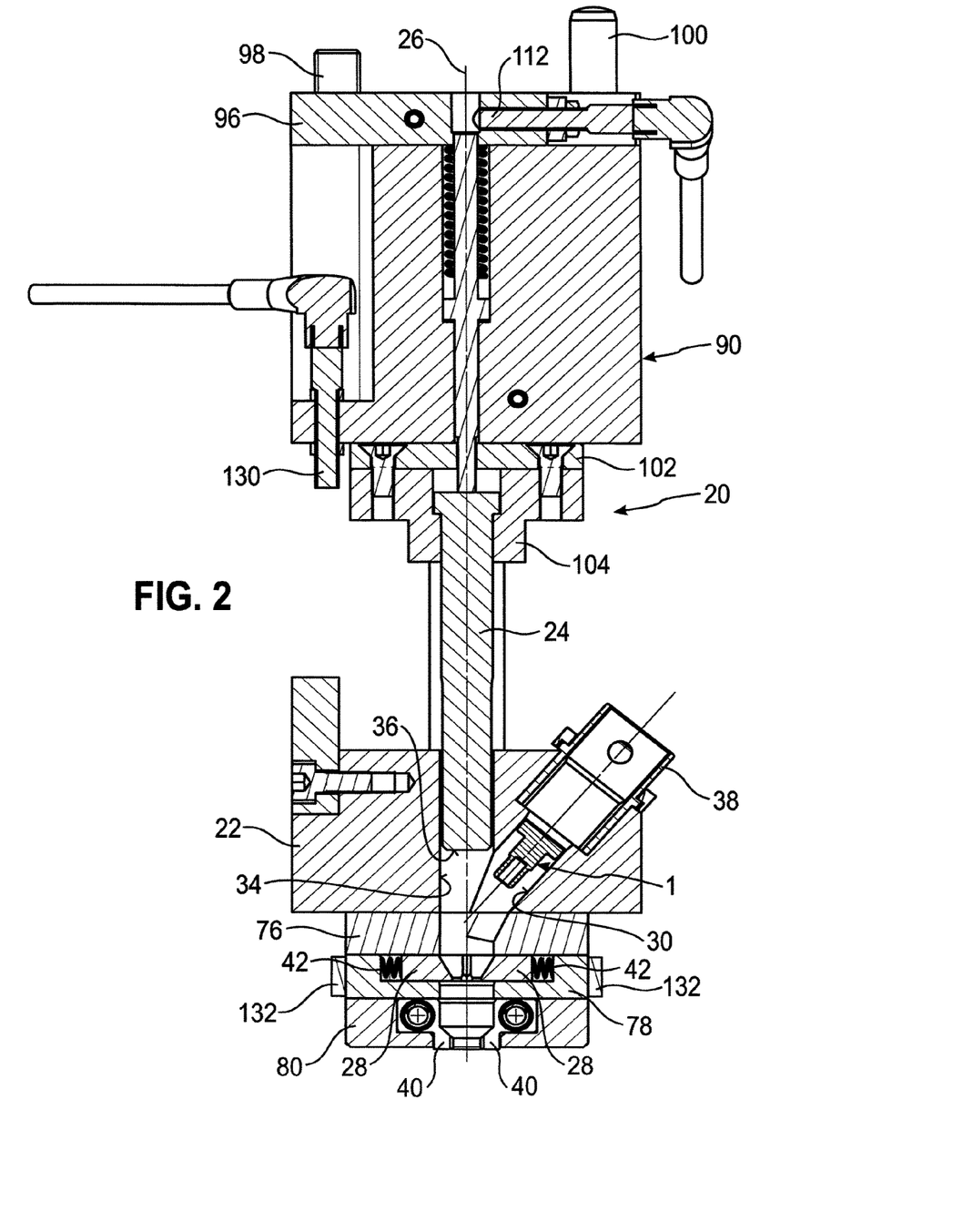

As can be seen from FIG. 2 in particular a guide and setting device 20 for elements such as 1, in particular fastener elements is provided which amongst other things consists of a hollow guide piece 22, a plunger 24 which is axially displaceably arranged within the guide piece 22 and holding members 28 which are displaceably guided perpendicular to the plunger and biased towards the longitudinal axis 26 of the plunger 24, i.e. of the guide piece 22.

Figure 3:
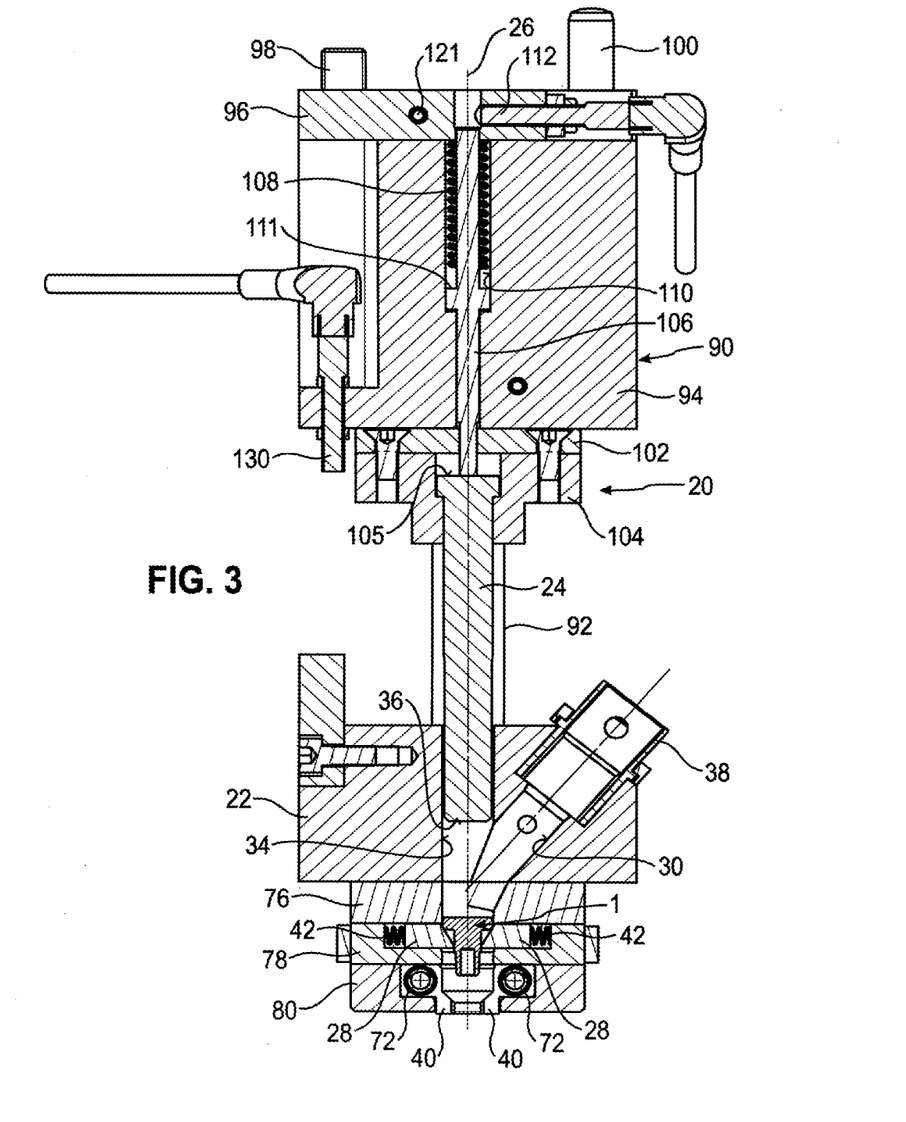

In the representation in accordance with FIG. 2 an element 1 is present in a guide passage 30 of the guide piece 22 and falls further under the action of gravity or of a blast of air from the position of FIG. 2 through the guide passé 30 and through a part of the plunger passage 34 into the position shown in FIG. 3. I.e. in the retracted loading position of the plunger 24 which is shown one respective element 1 is introduceable between the holding members 28 and the free end face 36 of the plunger 24.

The reference numeral 38 points to a connection for a conveying hose which can supply a plurality of elements, which can for example be delivered singly from a conveying and sorting apparatus (not shown) to the guide and setting device, as is for example described in EP-A-864 396.

Figure 4:
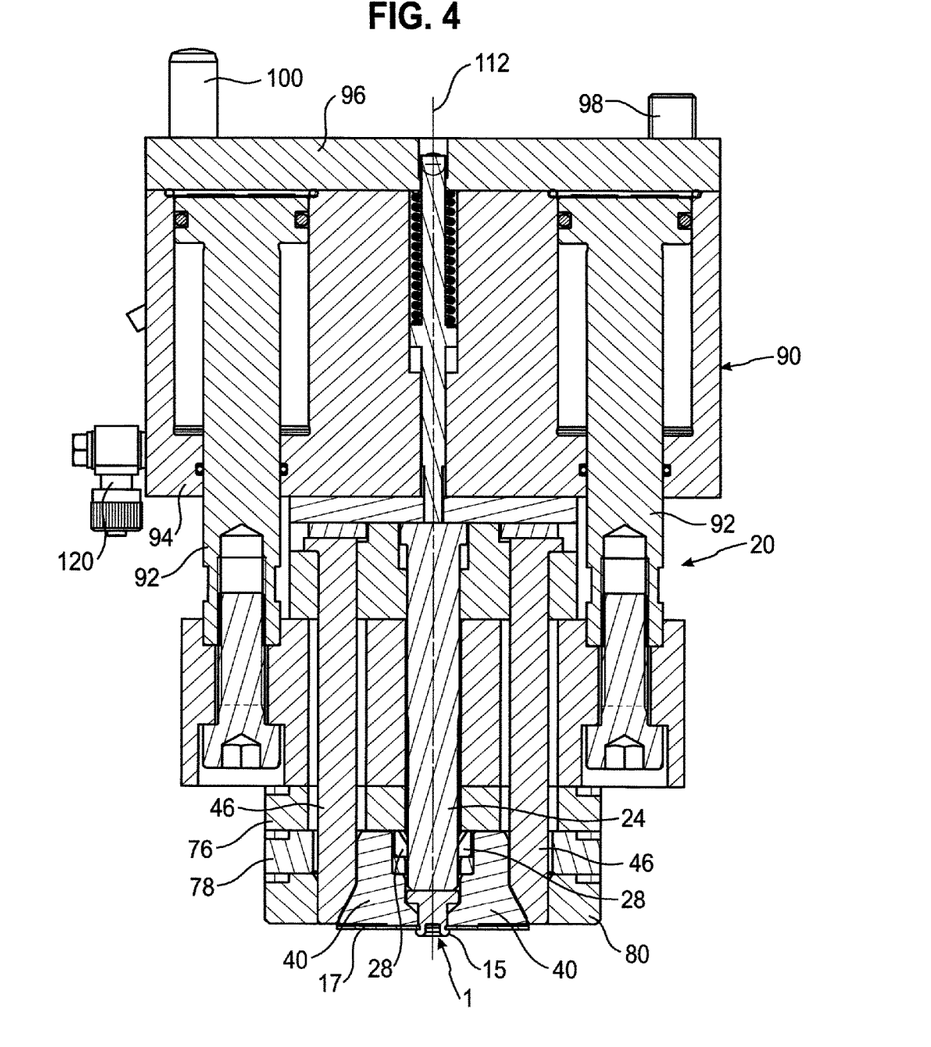

The holding members 28 can be opened as a result of the axial advance movement of the plunger 24 and the respective element 1 is then movable in the axial direction past the holding members 28 and indeed so that it is received under the pressure of the plunger by the further holding members 40 which follow the first named holding members 28, as shown in FIG. 4.

Figure 6:
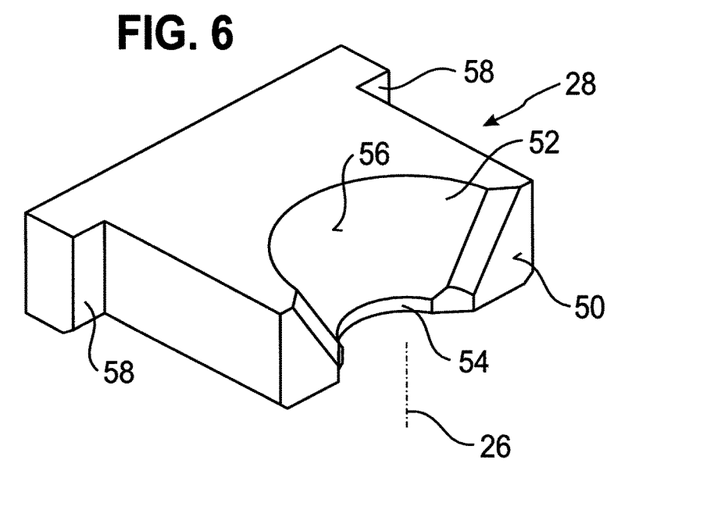

The precise form of the first holding members 28 of which two are present in this example and which are biased towards one another by springs 42 can best be seen from the perspective illustration of FIG. 6. The precise form of the further holding members 40, of which two are likewise present in this example and which are biased apart from one another by springs 42, can best be seen from the perspective illustration of FIG. 7.

Figure 5:
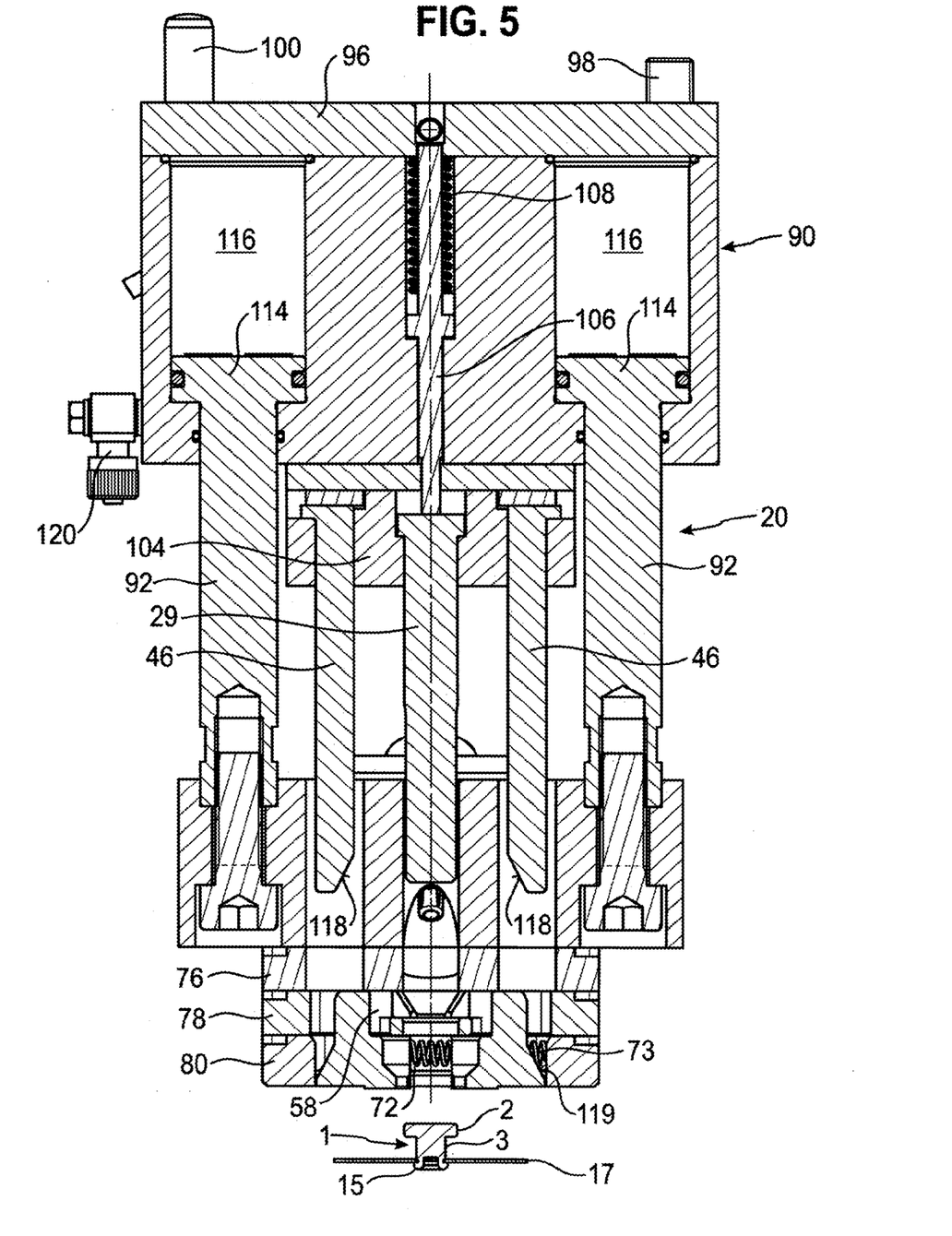

The further holding members 40 hold the element 1 in tilt-free manner during a setting stroke. As can likewise be seen from FIG. 4 two latching elements 46 are provided in this example which prevent an opening of the further holding members 40 during the so-called setting stroke but which, after the completion of the setting stroke, permit the opening of the further holding members 40 to release the element 1 as shown in FIG. 5.

The design of the guide and setting device will be explained in the following. The first holding members 28 have, in accordance with FIG. 6, a shape at their confronting end faces 50 which, following one another in the direction of the longitudinal axis 26 have at least one first section 52 which receives at least a region of the head part 2 (see FIG. 3) adjacent the shaft part and which tapers towards a second section 54, here a cylindrical section shown beneath the first section 52 in FIG. 6. The section 54 has a diameter which corresponds to the diameter of the shaft part. The sections 52 of the two holding members 28 have in this example ramp surfaces such as 56 which are designed in order to bring about the opening of the first holding members 28, i.e. a movement of the holding members 28 away from one another opposite to the bias force of the springs 42 by the head part 2 of the element 1 under the action of the plunger. The reference numeral 58 points to stops which—as can best be seen from FIG. 5—ensure that the partition plane formed by the end faces 50 of the holding members 28 is always centrally arranged in the closed state of the holding members 28, i.e. they lie symmetrically to the longitudinal axis 26. In this way it is also ensured that the element 1 is arranged coaxial to the longitudinal axis, i.e. so that the central longitudinal axis 19 of the element is aligned with the longitudinal axis 26. It should be said that the specific shaping of the holding members 28 can also be selected differently and is normally selected in dependence on the specific shape of the element 1. It is important that the element is secured against tilting by the holding members 28 in the region of the head part and of the shaft part, for which only certain contact points are necessary, and has certain ramps which permit an opening of the holding members by means of the head part of the element or by the free end of the plunger on movement of the plunger in the direction of the longitudinal axis 26.

Figure 7:
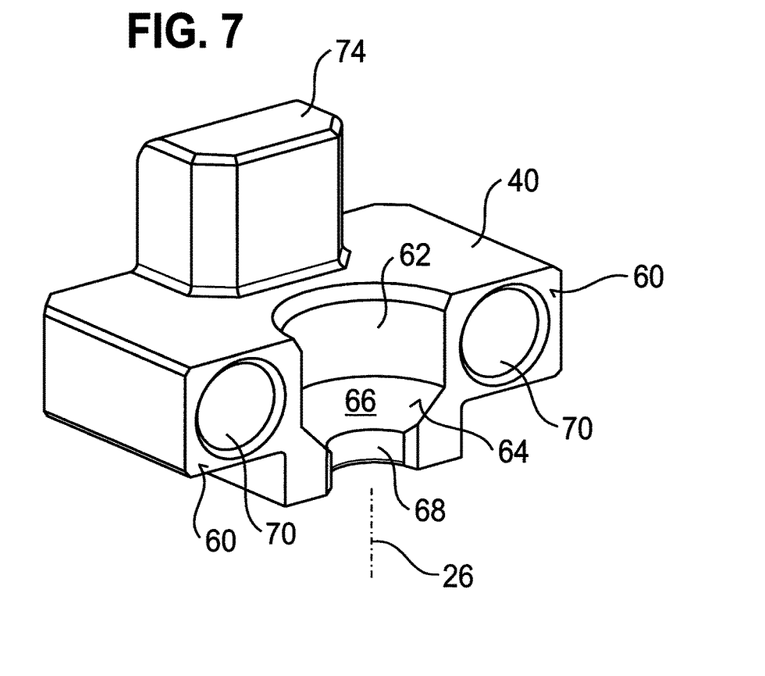

The further holding members 40 have at their confronting end faces 60 a shape which, following one another in the direction of the longitudinal axis, has at least one first section 62 which receives at least the region of the head part 2 adjacent the shaft part 3, a second section 64 which tapers from the first section 62 to the transverse dimension of the shaft part, with the inclined surfaces 66 of the second section being designed in order to open the further holding members 40 by the head part 2 on or after refraction of the latching elements 46 and hereby to free the respective element 1, and a third section 68 which acts on the shaft part 3 and holds the element 1 during the setting process or setting stroke, optionally in conjunction with the second section 62, tilt-free and coaxial to the longitudinal axis 26.

Two further blind bores 70 can further be seen from FIG. 7 which receive the compression coil spring 72 which bias the holding members outwardly. Optionally further compression coil springs such as 73 shown in FIG. 5 can be provided outside of the plane of the movement of the latching elements 46 which press the further holding members together opposite to the springs 72. In this way the further holding members 40 can be stabilized.

The specific shape of the further holding members 40 can also be selected differently here and normally is, depending on the specific shape of the element 1. It is also important here that the element 1 is secured against tilting at least in the region of the shaft part 3 by the further holding members 40, for which only certain contact points are necessary at the further holding members 40, and that these have certain ramps which enable an opening of the further holding members 40 by means of the head part 2 of the element 1 after the release by the latching elements 46.

It should also be pointed out that the further holding members 40 in this example also have upwardly projecting lugs 74 which respectively enter into engagement with the latching elements 46 and ensure a trouble-free sequence of the latching of the further holding members 40 prior to and/or during the setting stroke.

Furthermore, it can be seen, for example from FIG. 3, that the lower end of the hollow guide piece is formed by three plates 76, 78 and 80 which are secured to one another by screws extending in the axial direction which are not evident in the sectional drawing but which however are provided approximately in the corner regions of the approximately rectangular plates. The upper plate 76 in FIG. 3 forms a part of the plunger passage 34 for the guidance of the plunger and the head part of the element. Furthermore it forms a termination surface for the lower plate 78 in which a cutout is evident for the displaceably arranged first holding member 28 and—as can be seen from FIG. 4—for the working ends of the latching elements and the lobes 74. The third plate 80 has a cutout which displaceably receives the further holding members 40 and also the end regions of the latching elements 46. The extreme lower surfaces of the further holding members 40 in FIGS. 2 to 5 project fractionally beyond the lower side of the plate 80, which brings advantages during the riveting of the element to the sheet metal part in FIG. 5. The guide piece 22 can, if required, be surrounded by a sprung hold-down member (not shown) which presses the sheet metal part 17 against a lower tool of the press or against a die button (not shown) provided there.

The guide and setting device 20 in accordance with the invention further consists, as can be seen from FIGS. 2 to 6, of an attachment part 90 which serves for the attachment to a tool of a press and also of the hollow guide piece 22. The guide piece 22 is movably attached to the attachment part 90 via guides 92 which are carried by the attachment part 90, are biased away from it and are movable in the direction towards it.

In the use of the guide and setting device of the invention in a press, or in other positioning or attachment apparatuses, the attachment part 90 is secured to the upper tool of the press or to the intermediate plate of the press, or in an inverted arrangement to a lower tool of a press, here via a cover plate 96 screwed to the housing 94 by means of screws such as 98 and dowels such as 100, whereas the sheet metal part or the component to which the element is to be attached is carried by the intermediate plate of the press or by the lower tool of the press or, in an inverted arrangement, by the intermediate plate of the press or by the upper tool of the press. If another apparatus, such as a C-frame or a robot, carries the guide and setting device then the attachment part is attached to corresponding tools of the respective apparatus.

The plunger 24 is attached for a restricted movement in the direction of the longitudinal axis 26 relative to the attachment part 90 to the latter by means of two plates 102, 104 which can be screwed to one another and to the attachment part 90 at the bottom. The upper end face 105 of the plunger 24 is contacted by a sprung pin 106 (spring 108) which is arranged in a bore 110 of the attachment part 90 and presses against a collar 111 of the pin 106. When the lower end face 36 of the plunger 24 contacts the head part 2 of an element then the pin 106 is moved upwardly and triggers a signal at a sensor 112 which confirms that an element 1 is present and permits the further operation of the press.

The guides 92 are secured to respective pistons 114 which can slide in respective cylinders 116 of the attachment part. The pistons 114 or the cylinder spaces 116 are normally acted on by a pressure fluid such as compressed air at the side remote from the hollow guide piece 22 in order to bias the hollow guide piece away from the attachment part so that, when the press is open, the guide and setting device adopts the position in accordance with FIG. 2. The fluid pressure is delivered via the connection bore 118.

The pistons 114 and cylinder spaces at the side of the pistons 114 adjacent the hollow guide part can be acted on by a control pressure via the connection 120 and non-illustrated bores in the attachment part 90 in order to carry out a so-called control stroke of the plunger at the start of each press cycle. In this way the guide piece is moved upwardly in the direction towards the attachment part 90 whereby the plunger 29 necessarily moves in the direction towards the element 1 and, after contact of the element 1, moves upwardly with respect to the attachment part 90 until the abutment of its end face 105 at the lower side of the plate 102, whereby the control stroke is at an end, the sensor 112 triggers the corresponding signal and the control pressure is switched off. The guide piece 22 now moves away from the attachment part 90 again as a result of the pressure above the piston 114.

In the operation of the press this now begins to close until the underside of the further holding members 40 contact the sheet metal part. The further closing movement of the press then leads to the guide piece 22 being moved in the direction towards the attachment part 90 and the plunger 24 now entering into contact with the element 1 and pressing it out of the holding members 28 which are simultaneously opened, i.e. moved apart, and into the mount which is formed by the sections 62, 64, 68 of the further holding members 40. This further movement is accompanied by a prior movement of the further holding members 40 towards one another which is brought about by the ramp surfaces 118 of the latching elements 46. The latching elements 46 then wedge between the outer sides of the holding members 40 and the corresponding sides of the cutout in the plate 80 and prevent the further holding members 40 moving apart from one another and releasing the element. For this purpose the members 40 have a respective support surface 119 at their sides opposite to the named ramps 118 which contacts in the latched position against a fixed surface of the hollow guide piece, in this embodiment of the plate 80.

By further closing of the press the free end 36 of the plunger 24, which is blocked relative to the attachment part 90 from above, presses until the rivet section 5 of the element 1 is beaded over into a rivet bead 15, which takes place in known manner by means of a suitable die button in the tool of the press below the sheet metal part 17.

The press is now completely closed. By opening of the press the guide piece 22 first remains in contact with the sheet metal part under the pressure in cylinder spaces 116. The latching elements 46 retract however with the plunger 24 and with the attachment part 90 from the further holding members and from the element whereby the springs 72 attempt to open the further holding members 40 i.e. to move them apart. This occurs at the latest when the maximum spacing is achieved between the guide piece 22 and the attachment part, i.e. then when the pistons 114 have entered into contact with the lower ends of the cylinder spaces 116, whereby the further opening of the press forces the further holding members 40, as a result of the head-shape of the head part 2 of the element and the ramp surfaces 66 of the section 64, to move apart and release the element 1 which remains caught at the sheet metal part 17. This can for example be favored or brought about by a hold-down member or another device which presses the sheet metal part downwardly or holds it. If a hold-down member is provided then this is subsequently lifted by the further opening of the press to such an extent that the sheet metal part with the attached element can be removed from the press.

The method for the attachment of the element 1 to a sheet metal part 17 by means of a guide and setting device 20 takes place in the following manner:

a) the elements 1 which each have a head part 2 with a larger transverse dimension and a shaft part 3 with a smaller transverse dimension, in particular fastener elements, are introduced singly into the hollow guide piece 22 and are received in the region of the head part 2 with their shaft part 3 to the fore by the first holding members 28 biased towards one another, b) the element 1 is subsequently moved through the first holding members 28 by the plunger 24 axially displaceably arranged within the guide piece 22 during an opening movement of the first holding members 28 perpendicular to the longitudinal axis 26 of the plunger 24 which is brought about hereby, c) the respective element 1 is then received in a mount formed by further holding members 40 which hold the element 1 during the setting stroke, d) latching elements 46 are used in order to prevent opening of the further holding members 40 during the setting stroke and, e) after the completion of the setting process. the latching elements 46 are released in order to permit the opening of the further holding members 40 for the release of the element 1.

The reference numeral 130 points to a further sensor which determines the end of the setting stroke for control purposes and can also serve for the control of the pressure in the cylinder spaces 116. The reference numeral 132 points to spring holders which can be screwed to the corresponding sides of the plate 78 in order to introduce the springs 42 or to exchange them.

It should be pointed out that the position designations used here such as above, below etc. are simply to be understood with respect to the drawings and are in no way to be interpreted as being restrictive.

The invention claimed is:

1. A guide and setting device for an element, comprising a hollow guide piece, a plunger axially displaceably arranged within the guide piece and first holding members which are displaceably guided perpendicular to the plunger and biased in the direction towards a longitudinal axis of at least one of the plunger and the guide piece wherein, in the retracted loading position of the plunger, one element can be inserted between the holding members and the free end of the plunger, wherein the holding members can be opened as a result of the axial advance movement of the plunger and the respective element moved in the axial direction past the holding members, in that further holding members following the first holding members are provided which hold the element during a setting stroke and in that latching elements are provided which prevent opening of the further holding members during the setting stroke but after the completion of the setting stroke allow the opening of the further holding members to release the element.

2. The guide and setting device in accordance with claim 1, wherein the guide and setting device is designed to guide and set elements which each have a head part with a larger transverse dimension and a shaft part with a smaller transverse dimension; in that the first holding members have a shape at their confronting end faces which have, following one another in the direction of the longitudinal axis, at least one first section which receives at least one region of the head part adjacent the shaft part and tapers to a second section which is matched to the transverse dimension of the shaft part with inclined surfaces of the first section being designed in order to bring about the opening of the first holding members by the head part under the action of the plunger.

3. The guide and setting device in accordance with claim 2, wherein the element also has a rivet section forming a shoulder with the shaft part with the shoulder forming a sheet metal contact surface.

4. The guide and setting device in accordance with claim 2, wherein the further holding members have a shape at their confronting end faces which have, following one another in the direction of the longitudinal axis at least one first section which receives at least a region of the head part adjacent to the shaft part, a second section which tapers from the first section to the transverse dimension of the shaft part with inclined surfaces of the second section being designed to enable the opening of the further holding members by the head part on or after the retraction of the latching elements and hereby release the respective element and a third section which acts on the shaft part in order to hold the element free from tilting during the setting process, optionally in cooperation with the first section of the further holding members.

5. The guide and setting device in accordance with claim 1, wherein the first named holding members are formed by two oppositely disposed holding members which are biased towards one another by use of springs.

6. The guide and setting device in accordance with claim 1, wherein the further holding members are formed by two oppositely disposed holding members which are biased away from one another by use of springs.

7. The guide and setting device in accordance with claim 1, wherein the guide and setting device comprises an attachment part which is designed for the attachment to a tool of a press and also of the hollow guide piece which is movably attached to the attachment part via guides carried by the attachment part, means for biasing said hollow guide piece away from said attachment part and means for permitting movement of said hollow guide piece in a direction towards said attachment part and in that the plunger is attached to the attachment part.

8. The guide and setting device in accordance with claim 1, wherein the plunger is attached to the attachment part for a limited movement in the direction of the longitudinal axis relative to the attachment part, with an amplitude of the movement of the guide piece which is provided relative to the attachment part being larger than a restricted movement of the plunger relative to the attachment part which is provided and in that a device is provided in order to determine whether the plunger is located in a forwardly biased position or in an urged back position.

9. The guide and setting device in accordance with claim 6, wherein the means for biasing the hollow guide piece away from said attachment part comprises the guides and pistons secured to said guides and slideable in respective cylinder spaces of the attachment part and in that the pistons and the cylinder spaces can be acted on by fluid pressure at a side remote from the hollow guide piece in order to bias the hollow guide piece away from the attachment part.

10. The guide and setting device in accordance with claim 9, wherein a control pressure connection is provided to supply control pressure to the pistons and the cylinder spaces at a side adjacent the hollow guide piece.

11. The guide and setting device in accordance with claim 1, wherein the latching elements are formed by sliders.

12. The guide and setting device in accordance with claim 11, wherein the sliders extend parallel to the longitudinal axis and have respective ramps at their ends respectively adjacent the further holding members which cooperate with corresponding surfaces of the further holding members in order to move said further holding members towards one another and to keep them in engagement with the respective element.

13. The guide and setting device in accordance with claim 12, wherein the sliders have a respective support surface at their sides facing away from the ramps which contact a fixed surface of the hollow guide piece in the latched position.

14. A method for the attachment of an element to a sheet metal part by use of a guide and setting device, wherein a) the element, in particular a fastener element, has a head part with a larger trans-verse dimension and a shaft part with a smaller transverse dimension, is introduced into a hollow guide piece and is received by first holding members biased towards one another in the region of the head part with their shaft part to the fore, b) the element is subsequently moved through the holding members by a plunger axially displaceably arranged within the guide during an opening movement of the first holding members perpendicular to a longitudinal axis of the plunger which is brought about by the plunger, comprising c) receiving the respective element in a mount formed by further holding members which hold the element during the setting stroke, d) using latching elements in order to prevent opening of the further holding members during the setting stroke, and e) after the completion of the setting process releasing the latching elements in order to permit the opening of the further holding members for the release of the element.

15. The method in accordance with claim 14, wherein the plunger is restrictedly moveably arranged relative to a fixed part of the guide and setting device and the presence of an element is determined in that on the approach of the plunger to the element held by the first holding members contact of the plunger with the element leads to a restricted deviation movement of the plunger relative to a fixed part which is detected.

16. The method in accordance with claim 14, further comprising attaching the guide and setting device to a tool of a press and the recited steps a) to e) are brought about by the closing and subsequent opening of the press.

17. The guide and setting device according to claim 1, wherein the element is a fastener element.

* * * * *